(No Model.)
F. A. WELLES.
CALIPERS OR DIVIDERS.
No. 402,876. Patented May 7, 1889.
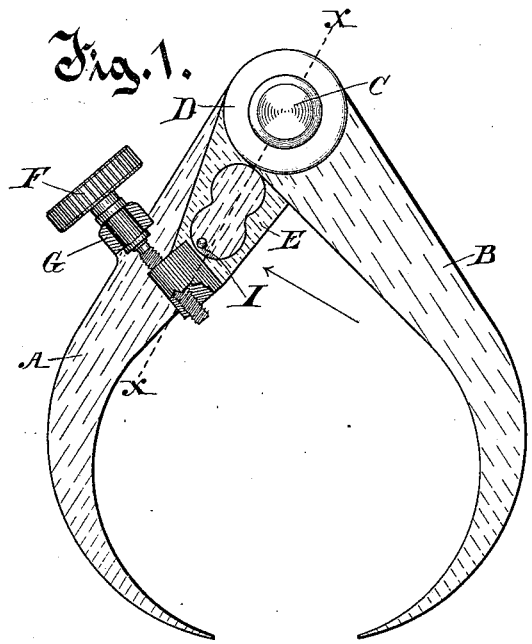
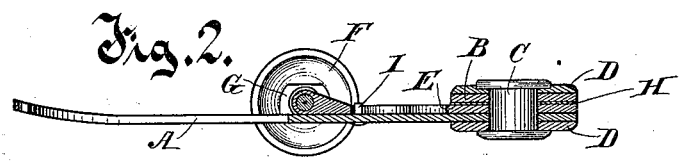
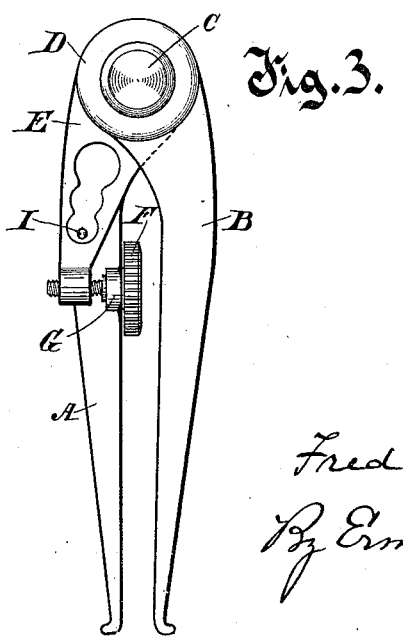
Witnesses.
C. H. Keeney,
Anna Faust
Inventor.
Fred A. Welles
By Erwin W. Benedict
Attorneys.

UNITED STATES PATENT OFFICE.

FRED A. WELLES, OF MILWAUKEE, WISCONSIN.

CALIPERS OR DIVIDERS.

SPECIFICATION forming part of Letters Patent No. 402,876, dated May 7, 1889.

Application filed January 11, 1889. Serial No. 296,071. (No model.)

*To all whom it may concern:*

Be it known that I, FRED A. WELLES, of Milwaukee, in the county of Milwaukee and State of Wisconsin, have invented new and useful Improvements in Calipers; and I do hereby declare the following to be a full, clear, and exact description of said invention, reference being had to the accompanying drawings, and to the letters or figures of reference marked thereon, which form a part of this specification.

The object of my invention is to provide means for conveniently and easily adjusting the legs of calipers with ease and exactness, and by a device which is especially adapted for moving the legs of the calipers slight distances with relation to each other.

In the drawings, Figure 1 is a view of my complete device as embodied in a calipers adapted for outside measurement of pipes, &c. Fig. 2 is a longitudinal section on line X X of Fig. 1, looking in the direction of the arrow. Fig. 3 is a modified form of calipers adapted for the inside measurement of pipes, with my improvement embodied therein.

The legs A and B of the calipers are pivoted together, one upon the other, by the rivet C, having a head on one end and being upset and headed down at the other end. Washers D D are also preferably used about the rivet under its heads against the legs of the calipers. A short friction-arm, E, is inserted between the legs of the calipers, and the rivet C passes through it, providing for its swinging movement, common with the legs of the calipers. A thumb-screw, F, has its shank journaled in a bracket, G, formed integral with or affixed rigidly to one leg of the calipers, in which bracket the thumb-screw has rotary movement, but is held against any endwise movement by collars or shoulders adapted therefor. The screw-threaded end of the shank of the thumb-screw F turns into the screw-threaded end of the arm E, whereby the arm E may be swung laterally with reference to the leg to which the thumb-screw is attached to a limited extent by rotating the thumb-screw. This movement of the arm E relative to the leg of the calipers to which the thumb-screw is attached will carry the other leg of the calipers with it, the set of the rivet being such as to hold the legs of the calipers so firmly, though movably, against the arm that the movement of the arm relative to one leg will by friction carry the other leg with it; but to provide a more perfect friction-bearing between the arm E and the free leg B, I insert between them a copper or other soft-metal plate, whereby a proper friction between the arm and leg of the calipers is more perfectly established.

A pin, I, fixed in the leg A and projecting into an aperture or slot therefor in the arm E, is adapted to limit the movement of the arm.

In the form of calipers shown in Fig. 1 the head of the thumb-screw is preferably located on the outside of the leg, while in the form of calipers shown in Fig. 3, adapted for measuring the inside of a pipe, the head of the thumb-screw is preferably located on the inside of the leg.

What I claim as new, and desire to secure by Letters Patent, is—

1. A calipers consisting of two legs, A and B, formed of single flat plates pivoted together by a rivet, C, in combination with a friction-arm, E, formed of a single flat plate of metal interposed between the legs A and B, which arm is pivoted on the rivet C and extends from the rivet in the same direction as the legs of the calipers, and a thumb-screw, F, having its shank journaled in a bracket, G, formed integral with one leg of the calipers, in which bracket the thumb-screw has rotary motion, but no endwise motion, the thumb-screw turning into a screw-threaded enlarged nut end of the friction-arm E, substantially as described.

2. A calipers consisting of two legs, A and B, pivoted together, in combination with a single flat-plate friction-arm interposed between the two legs, a thumb-screw, F, journaled in one leg of the calipers and turning into the friction-arm, and a pin, I, inserted in the inner side of one leg of the calipers, which pin projects into a slot or aperture therefor in the friction-arm, whereby the relative movements of the friction-arm and the leg of the calipers, in which the thumb-screw is journaled, are limited, substantially as described.

In testimony whereof I affix my signature in presence of two witnesses.

FRED A. WELLES.

Witnesses:
C. T. BENEDICT,
A. C. H. KEENEY.